United States Patent [19]
Meier

[11] Patent Number: 5,151,809
[45] Date of Patent: Sep. 29, 1992

[54] MIRROR SUPPORT ARRANGEMENT FOR A PRIMARY MIRROR OF A TELESCOPE

[75] Inventor: Hans-J. Meier, Aalen, Fed. Rep. of Germany

[73] Assignee: Carl-Zeiss-Stiftung, Heidenheim, Fed. Rep. of Germany

[21] Appl. No.: 722,884

[22] Filed: Jul. 1, 1991

[30] Foreign Application Priority Data

Jul. 10, 1990 [DE] Fed. Rep. of Germany ....... 4021647

[51] Int. Cl.⁵ .............. G02B 7/18; G02B 5/08
[52] U.S. Cl. .................... 359/846; 359/848; 359/849
[58] Field of Search .......... 350/607, 608, 609, 611; 359/846, 847, 848, 849

[56] References Cited

U.S. PATENT DOCUMENTS

| | | |
|---|---|---|
| 4,500,170 | 2/1985 | Montesanto . |
| 4,632,523 | 12/1986 | Knohl .................. 350/611 |
| 4,664,488 | 5/1987 | Sawicks et al. ............ 350/607 |
| 4,775,230 | 10/1988 | Meier ................. 350/611 |
| 4,875,764 | 10/1989 | Marino et al. ............ 350/607 |
| 4,959,531 | 9/1990 | Marino ................ 350/611 |
| 4,993,823 | 2/1991 | Schaffer, Jr. et al. .......... 350/611 |
| 5,035,497 | 7/1991 | Itoh ................... 350/607 |

FOREIGN PATENT DOCUMENTS

| | | |
|---|---|---|
| 1039252 | 9/1958 | Fed. Rep. of Germany ...... 350/611 |
| 3521973 | 7/1986 | Fed. Rep. of Germany . |
| 3908430 | 9/1989 | Fed. Rep. of Germany . |
| 0667936 | 6/1979 | U.S.S.R. ................. 350/611 |

Primary Examiner—Bruce Y. Arnold
Assistant Examiner—R. D. Shafer
Attorney, Agent, or Firm—Walter Ottesen

[57] ABSTRACT

The mirror support arrangement of the invention takes up force components in the azimuthal axis of the primary mirror of a telescope as well as moments about the mirror axis at the location where they are developed. Although forces of this kind cannot occur in earthbound telescopes, a rapid rotation about several axes can generate such moments especially when the mirror is driven in a mount having three orthogonal drive axes. A hydraulic lateral support acts at several points on the rear side of the mirror. This support is realized in the form of a V-support. The lateral V-support can take up all lateral forces within the V-angle.

6 Claims, 4 Drawing Sheets

5,151,809

MIRROR SUPPORT ARRANGEMENT FOR A PRIMARY MIRROR OF A TELESCOPE

FIELD OF THE INVENTION

The invention relates to a mirror support arrangement for the primary mirror of a telescope. The mirror support arrangement provides a three-point support in that an axial support system is provided on support points in a raster at the rear side of the mirror which permits a paraxial assembly.

BACKGROUND OF THE INVENTION

Mirror supports are very critical in that they can easily cause certain support-associated deformations to occur on the reflective surface. However, a deformed mirror has greatly reduced use qualities and does not provide the required image quality when used in a telescope.

There are a total of six degrees of movement associated with the mirror support. For this reason, one distinguishes the axial, the lateral and the rotation-restrictive force-free supports.

The axial mirror support fixes three of the six degrees of movement of a mirror. If a mirror has an axial mirror support, then the mirror can move only in one plane (two of the total of six degrees of movement) and the mirror can rotate about itself (the last of the six degrees of movement).

The plane defined by the axial mirror support is obtained by a so-called three-point support. If in addition, an attempt were made to cover the remaining degrees of movement with the axial mirror support, then a transmission of stresses to the mirror could not be prevented which would cause unwanted deformations on the mirror surface. The axial mirror support normally acts at several points on the rear side of the mirror and can, for example, comprise hydraulic elements or lever systems. The connection between the support and the mirror takes place via linkages which are as free of friction as possible such as ball bearings and the like.

Because of the conditions described above, a mirror support has at least one further mirror support in addition to the axial mirror support. This additional mirror support engages either at the outer side of the mirror or at its central bore as is known in the state of the art.

The method used the most for realizing such a mirror support is the push/pull system at the outer mirror edge as well as its different variations. This mirror support is present in addition to the axial mirror support. This push/pull system is suitable for a general spatial position fixation of a mirror as is required for primary mirrors in telescopes having paraxial assembly. Since the support forces in this system act only laterally on the mirror body, constant stresses develop in the mirror which cause the quality thereof to deteriorate.

An alternative known for this purpose is the combination of an axial and a radial support system having a centering tube. The axial and the radial support systems are located below the mirror with the moments of the radial supports resulting therefrom being compensated by counter moments such that the radial forces act in the gravitational force plane of the mirror. The methods used for the axial and radial support at the rear side of the mirror can however only be used with an azimuthal assembly. If force components parallel to the azimuth axis occur, then these cannot be taken up by the system and therefore are taken up by a centering tube at the mirror center in the known configurations. However, a transmission of stresses to the mirror takes place here which greatly reduces the optical imaging qualities of the mirror.

Both known solutions are not suitable to take up larger force components in the azimuthal axis without stresses being transmitted to the mirror thereby greatly reducing the optical imaging qualities.

SUMMARY OF THE INVENTION

It is an object of the invention to provide a mirror support arrangement which provides an axial mirror support as well as a further mirror support which can distribute the forces acting perpendicularly to the optical axis uniformly on the mirror.

The mirror support arrangement of the invention is for the primary mirror of a telescope subjected to forces acting laterally on the mirror. The mirror defines an optical axis and has a rear side. The mirror support arrangement includes: The mirror defining a plurality of first support points arranged in a raster on the rear side thereof and a plurality of second support points also arranged on the rear side; an axial support system having a plurality of axial support elements acting at respective ones of the first support points to simulate a three-point axial support of the mirror; and, a lateral support system having a plurality of lateral support elements acting at respective ones of the second support points for distributing the forces to the second support points.

The lateral support system primarily carries exclusively those force components which act perpendicularly to the optical axis when the mirror is pivoted from a lying position into a standing position as for a rotation about the elevation axis in an azimuthal mount.

In an earthbound telescope, no acceleration forces occur in the direction of the elevation axis (perpendicular to the optical axis and gravity direction) and there is also no rotational moment about the optical axis. However, such moments can occur when the mirror must be rotated about three orthogonal axes. Forces in the direction of the elevation axis develop because of accelerations of the telescope in a movable system.

The mirror support according to the invention provides its special advantages especially when the mirror is disposed in stabilized systems on vehicles or flying bodies such as aircraft and rockets.

The mirror is prevented from becoming laterally displaced with the support system of the invention by a support system which engages on the rear side of the mirror in a surface-covering point-like manner. This solution affords the advantage that no strong forces act at the central bore or at the mirror edge; instead, these forces are distributed as uniformly as possible over the entire rear side of the mirror. In this way, a reduce deformation of the mirror surface is obtained when lateral forces act and a significant improvement of the optical characteristics of the mirror is obtained especially when the mirror is used in accelerated carrier systems.

The elements of the lateral support system can be subdivided into two groups with the elements of both groups being aligned at an angle to each other (V-support). With this arrangement, lateral forces within a V-angle can be taken up. For small mirrors, a simple V-type support would be adequate in order to accommodate the forces within a V-angle. For larger primary mirrors, the lateral forces must be distributed over a large number of engaging points on the rear surface of the mirror so that the resultant deformations do not cause impermissibly large optical errors.

The number of support points of the axial and of the lateral support system can be minimized if the lateral support system uses the support points of the axial support system and these points are thereby coincident.

Lateral moments occur if the elements of the lateral support system are attached outside of the gravitational center of a part of the mirror belonging to a support point. These lateral moments can be avoided by providing elements at every support point to compensate for lateral moments.

A very uniform force distribution is obtained if the elements of the axial and of the lateral support systems are present at every support point.

The rotation of the mirror about its optical axis can be prevented with a rotation stop. The single constructive purpose of this rotation stop is to prevent the mirror from rotating. All other movements should not be hindered by the rotation stop and take place completely free therefrom. All degrees of movement of the mirror can be determined by means of the rotation stop together with the axial and lateral support systems. In this connection, it is advantageous if the elements of the rotation stop act on the support points of the axial and/or lateral support systems and comprise several elements.

It is also very advantageous if all elements are hydraulic elements since all error variables can be minimized with these elements For this purpose, it is necessary to provide a compensating system which makes possible the compensation of the hydrostatic effect.

It is still further advantageous if a device for active surface control is provided at each support point. This device functions to balance surface errors of the mirror which are independent of time. The device should make possible the addition or subtraction of an adjustable force at each support point. It is advantageous that the device needs energy only when a change of the force takes place which is advantageous because no warming takes place. The device can then actively correct long-wave errors (mirror manufacturing errors and surface errors independent of time) on the mirror surface or focusing errors caused by acceleration in a timely manner and independently of amount.

BRIEF DESCRIPTION OF THE DRAWINGS

The invention will now be described with reference to the drawings wherein:

FIG. 1b is a side elevation view of the mirror shown in FIG. 1a;

DESCRIPTION OF THE PREFERRED EMBODIMENTS OF THE INVENTION

Figure 1A:
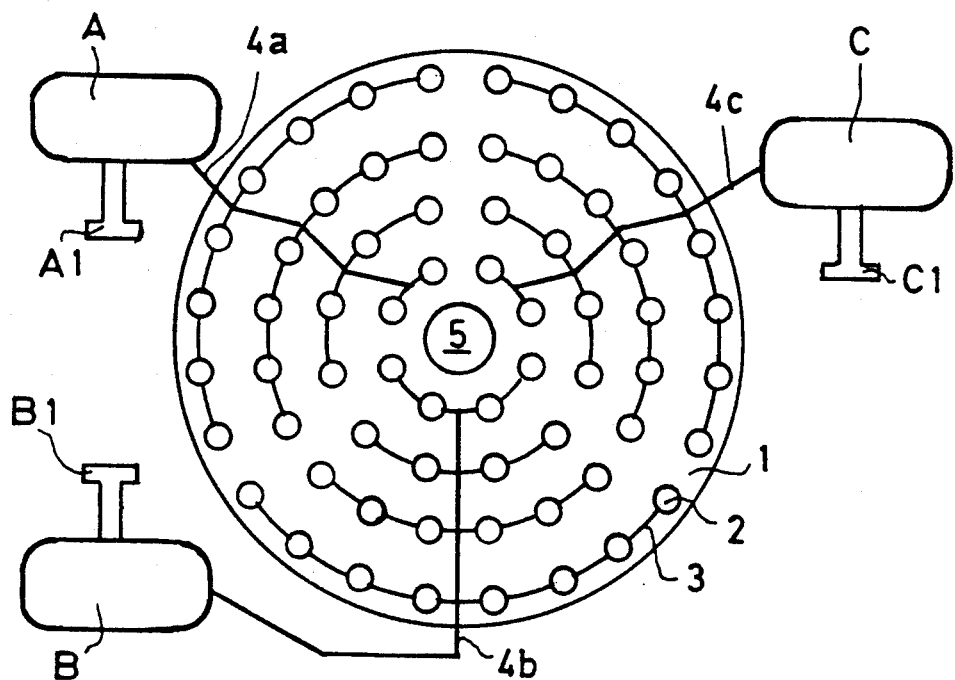
FIG. 1a is a schematic showing the distribution of the support point raster of an axial hydraulic system on the lower side of the mirror.
Figure 1B:
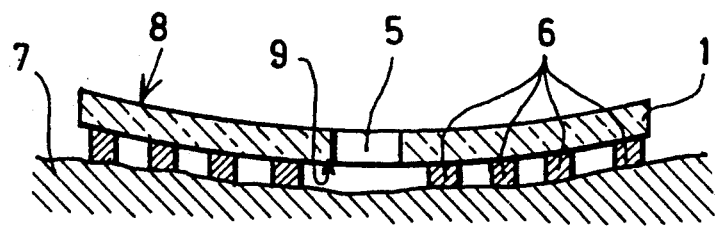

The primary mirror shown schematically in FIGS. 1a and 1b has only a slightly arcuate mirror surface 8. The mirror is configured so as to be as thin as possible so that the mirror is as light as possible. The body of the mirror is made of Zerodur which is a ceramic material having a temperature expansion coefficient of almost zero. The thickness reduction of the mirror body reduces the stiffness of the mirror 1. The stiffness of the mirror 1 reduced by the thickness reduction must be compensated by a support system which holds the mirror 1 in its desired and required shape notwithstanding the deformation of the cell structure which functions as a support body 7.

The support system then decouples the extremely deformation sensitive optical surface 8 of the mirror 1 from the supporting mechanical structure 7 which is relatively coarse. The axial support system is mounted at the rear side 9 of the mirror and must be optimally distributed with its 64 support points 2 on four support rings so that this large number of support points 2 works as a unit as though the mirror 1 was supported only at only three points (three-point support). The mirror 1 is then fixed by the support system precisely in a plane and no stresses are transmitted by the support system to the mirror 1. Such stresses would otherwise cause mirror deformation.

As a practical matter, only small and thick mirrors can be supported at three points. All larger mirrors 1 and especially thin mirrors 1 having a slight curve require a large number of support points 2 which are uniformly distributed on support rings about the periphery.

The optimization of the support ring radii minimizes the total deformation of the mirror as a function of the support radii and the position of the support elements 6 and generates a deformation image as uniform as possible on the mirror surface 8. This can take place with a computer program.

A number of support points are pregiven for this purpose. This predetermination defines the support raster with the exact position determination thereof being provided by the computer program. The plate deformations are computed in two steps with the first step supplying optimized support radii and the second step supplying the best position of the elements in peripheral direction.

Because of the many support points 2, the forces are uniformly distributed so that, even in the presence of linear accelerations acting axially from the outside especially in the direction of the optical axis, the mirror 1 reacts relatively insensitively with respect to its surface deformation.

The joints present between mirror 1 and the support system are configured as known in the art and must move as free from friction as possible with the joints providing a stress-free support both thermally and mechanically.

The hydraulic elements 6 for the axial support system as well as for the lateral support system are disposed at the lower support points 2. The support systems will be explained in greater detail with respect to FIG. 2.

Figure 4:
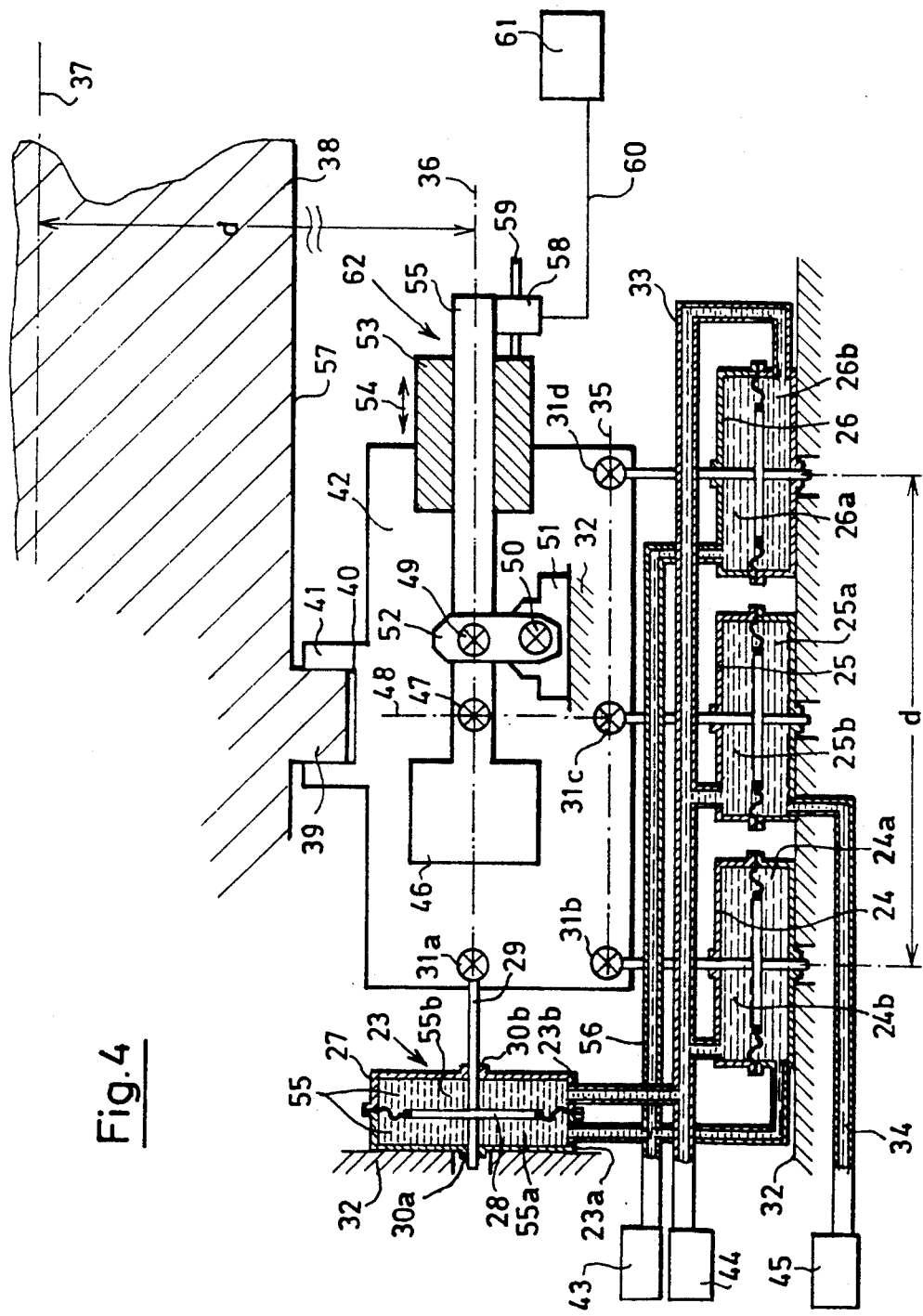
FIG. 4 is a schematic showing the hydraulic elements of the axial and of the lateral support systems at a support point; and, FIG. 5 is a schematic for explaining the compensation of the hydrostatic effect.

The schematic showing the elements below a support point 2 on the rear side 9 of the mirror is shown in FIG. 4.

The individual hydraulic elements 6 of the axial support system are connected to each other within their groups via hydraulic lines 3. These hydraulic lines 3 between the individual support points 2 of a group join to three primary hydraulic lines (4a, 4b, 4c).

The primary hydraulic lines (4a, 4b, 4c) lead to three axial support volumes (A, B, C), respectively, at which the volume of the three hydraulic circuits can be changed via screws (A1, B1, C1). By adjusting the three screws (A1, B1, C1), the possibility is provided to fix the axial position of the mirror 1 and its inclination relative to the support body 7. No part of the support system acts on the central bore 5 of the mirror 1.

The axial support system has unified hydraulic elements and the precise description as to how these elements are configured is provided with respect to FIG. 4. This however is only possible if the support raster is so optimized in the previously described form that the forces at each point have the same magnitude. Then, the number of points can be grouped into three large groups as uniformly as possible. The desired statical determination of a three-point support is obtained by the coupling of the individual elements of a group with each other as described above.

The axial support system described here is itself balanced with respect to the weight of the mirror and can be utilized for each position angle of the telescope.

Figure 2:
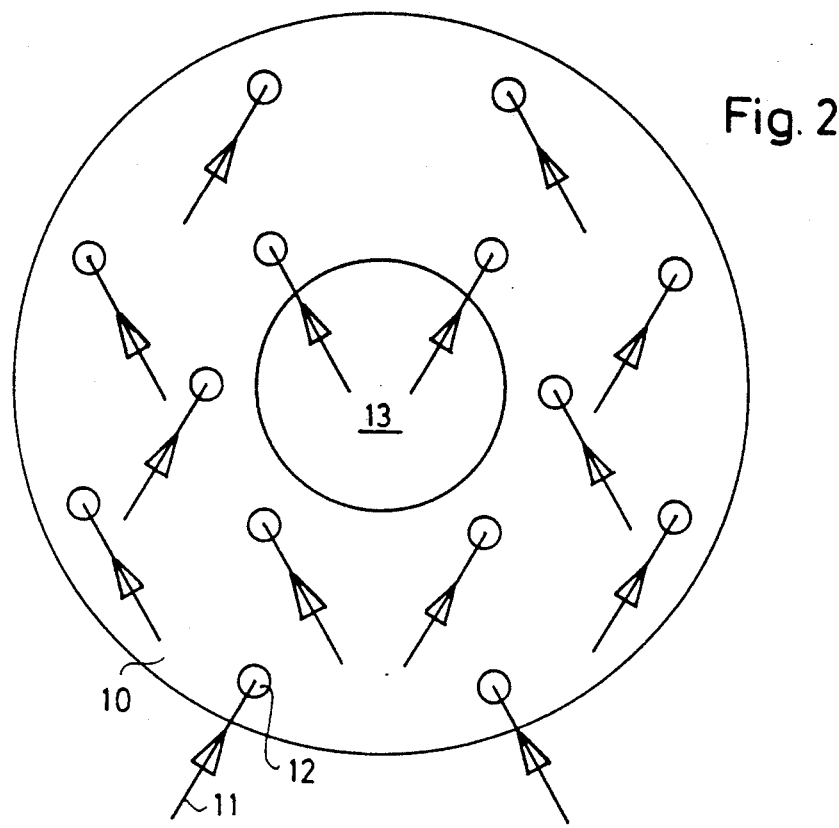
FIG. 2 is a schematic showing the orientation of the elements of the lateral hydraulic system on the lower side of the mirror.

The lateral support system shown in FIG. 2 acts at each support point of the axial support raster on the rear side of the mirror. For the purpose of providing an overview, the number of the support points 12 and also the number of the support rings is greatly reduced in FIG. 2.

The distribution pattern for the lateral support system is the same as the axial pattern. The number of support points 12 is distributed in two groups of equal number with the support points 12 each forming a hydraulic circuit. The individual elements of the support system will be explained later.

All elements acting at the support points 12 (see FIG. 4) of a group of lateral support systems are orientated in the same direction and have an angle of ±20° to the optical axis. The orientation of the hydraulic elements to each other is indicated by the arrow 11. This will be explained in greater detail with respect to FIG. 4.

In principle, it is not significant which of the elements belongs to which group. In order to obtain a good compensation of forces and thereby a good optical capacity of the mirror 10, the distance between each two opposite acting elements at the different support points 12 should be as short as possible. The distribution of the elements at the support points 12 cannot be below certain distances because of considerations of construction (especially because of the size and shape of the elements).

The lateral V-support shown here can take up all lateral forces 11 within the V-angle. In the gravity field, the resultants of all individual forces intersect in a point approximately in the central bore 13 of the mirror 10. This point is maintained fixed in position by the support system.

The lateral support system fixes two further degrees of movement of the mirror 10 and anchors the mirror to the surface defined by the three points of the axial attachment system (as described with respect to FIG. 1).

This mirror support system made up of axial and lateral support systems is adequate for most applications. The single remaining degree of freedom for the mirror movement is the rotation about the optical axis.

Figure 3:
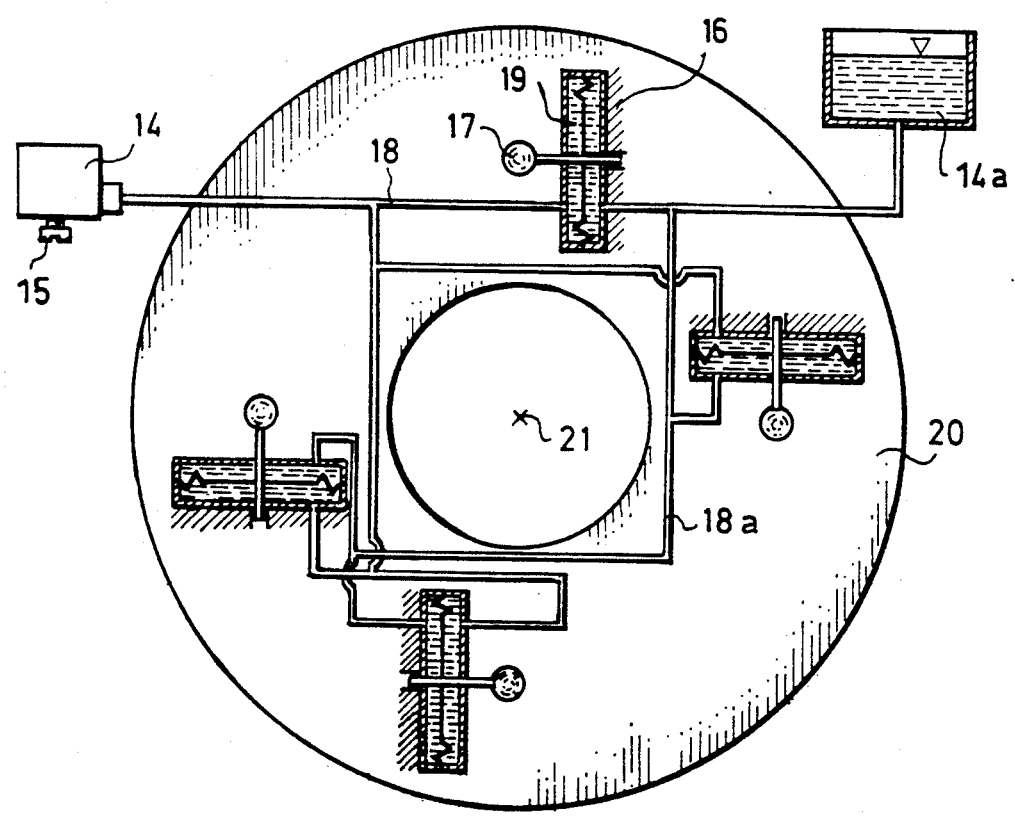
FIG. 3 is a schematic of a hydraulic rotation stop.

In FIG. 3, a rotation stop (rotation blocking system) is shown which prevents a rotation of the mirror 20 about its optical axis 21. The single constructive object of this rotation stop is to prevent the rotation of mirror 20. All other movements should not be impeded by the rotation stop and can take place completely free of the rotation stop. In this way, all degrees of freedom of the mirror 20 can be fixed with this rotation stop together with the axial and lateral support system.

The rotation stop comprises four hydraulic elements 19 which are connected to each other via hydraulic lines (18, 18a). The hydraulic elements 19 can act on selected support points of the axial support system.

The circuit connected via the hydraulic line 18 further has one reserve tank 14 with adjustable volume. The mirror 20 can freely move in every lateral direction because the elements 19 are orientated in pairs in mutually opposite directions. In contrast, the rotation of the mirror 20 is possible only when the fixed hydraulic volume 14 is changed. This can take place as shown in FIG. 3, for example, via a screw 15. The controlled and desired rotation can be used for the fine adjustment of the mirror 20. All chambers of the loop 18a serve to a hydrostatic pressure difference on the chambers of the loop 18. The loop 18a is connected to the common tank 76 in FIG. 5.

The individual elements 19 are connected at their rear side to the supporting support body 16. A joint 17 is located on the forward side of elements 19 for attaching the mirror 20. The elements 19 of the rotation stop are functionally identical to the elements at the support points 12 in FIG. 2 of the lateral support system as well as to the elements at the support points of the axial support system.

In FIG. 4, it is shown how the elements (23, 24, 25, 26) of the axial and lateral support systems act on one support point. The functional effect of the individual hydraulic elements (23, 24, 25, 26) is however identical and is explained in greater detail in the following with respect to an element 23.

In principle, hydraulic element 23 is a simple metal bellows. For this reason, the element 23 has a housing which comprises two discrete tightly connected housing shells (23a, 23b). In principle, one housing shell 23a would be adequate for driving the hydraulic elements. However, the housing includes a second housing shell 23b in order to carry out a compensation of the hydrostatic pressure and the error effect caused by this pressure (description follows with respect to FIG. 5). Both housing shells (23a, 23b) have an adequately large material thickness so that neither outer nor inner pressure fluctuations lead to a change of the hydrostatic volume.

Openings (30a, 30b) are provided in respective housing shells (23a, 23b) wherein a rod 29 can move freely. This rod 29 is fixedly connected to a piston 28 which is disposed approximately on the connecting line of the two housing shells (23a, 23b) which are tightly connected to each other. The piston 28 is connected via a membrane 27 on all sides to the housing shells (23a, 23b).

A substantially gasless liquid is present in both hollow chambers 55. A housing part 23a is fixedly connected to the support body 32. The support body 32 is so configured below the rod 29 that the rod 29 can move freely in a direction toward the support body 32.

Both hollow chambers 55 in the two housing shells (23a, 23b) are connected via hydraulic lines (33,56) to hollow chambers of other hydraulic elements at other support points (see the description with respect to FIGS. 1 to 3) as well as to the closed supply vessels (43, 45); whereas in contrast thereto, vessel 44 is open and therefore compensates additional air pressure fluctuations.

A joint (31a to 31d) is provided at one end of the rod 29 of each element (23 to 26). The joint provides a connection between the hydraulic element (23 to 26) and an intermediate body 42 which is as friction free as possible. The intermediate body 42 itself has a releasable rigid connection to the mirror 38. For this purpose, at the support point, a knob 39 on the rear side 57 of the mirror 38 projects into a socket 41 on the upper side of the intermediate body 42 and is held there in a clamplike manner. An air gap 40 remains between the lower side of the knob 39 and the inner end of the socket 41 so that no stress is transmitted to the mirror 38 made of Zerodur in the event there is a thermal expansion of the metal intermediate body 42. The radial clamping is likewise configured so as to be temperature compensating.

Although the functional configuration of the individual hydraulic elements (23, 24, 25, 26) is identical, they nonetheless have different functions.

One hydraulic element 25 belongs to the axial support system. This hydraulic element with its joint 31c is mounted directly below the knob 39 on its center perpendicular 48. The housing part of the hydraulic element 25 belonging to the lower hollow chamber 25a is fixedly connected to the support body 32. The hollow chamber 25a filled with liquid is connected via a hydraulic line 34 to the other hydraulic elements belonging to its group (see description with respect to FIGS. 1a and 1b) as well as to the supply vessel 45 of the axial system. The upper hollow chamber 25b of the hydraulic element 25 is filled with liquid and is connected to the supply vessel 44 of the hydrostatic pressure compensation.

The hydraulic elements (23, 24, 26) have different tasks. The one hydraulic element 23 belongs to one of the two hydraulic circuits of the lateral support system. In each of the two circuits, the corresponding hollow chambers 55a are connected to each other via hydraulic lines 33 (see also description with respect to FIG. 2). The direction of the elements 23 on the intermediate body 42 is shown by the force arrow 11 in FIG. 2.

The two other hydraulic elements (24, 26) of the lateral support system are attached at their rear side to the support body 32 at this support point and compensate moments which occur because of the support of the hydraulic element 23 outside of the gravity center of one part of the mirror 38 belonging to the support point. With the hydraulic method applied here, a compensation of the lateral moments is possible directly at the location where they are generated.

The lateral moments can only then be prevented when at least the lateral support system would be attached directly in the gravitational center of the mirror 38. The position of the gravitational center connecting line (plane) 37 is almost precisely in the center of the mirror 38. The attachment of the mirror to a support system in the gravitational center (COG) can therefore be realized only with relatively thick mirrors. For this purpose, large and deep holes are necessary in the rear side of the mirror with the depth of these holes having a magnitude greater than half the mirror thickness. This is not advantageous for thin mirrors 38 having a stability which is already reduced.

However, if the attachment is not made at the gravitational centers, the lateral attachment of the lateral support system without compensation generates moments at the rear side 57 of the mirror which greatly deteriorate the optical quality of the mirror 38 when used.

In the hydraulic compensation of moments shown in FIG. 4, the moment of the hydraulic pressure of the one hollow chamber 55a of the hydraulic element 23 of the lateral support system is transmitted to two further hydraulic elements (24, 26) having respective hollow chambers (24a, 26a) which are connected via the hydraulic line 56 to the hollow chamber 23a of the hydraulic element 23. The two hydraulic elements (24, 26) then operate in the opposite direction. The distance (d) of the two additional hydraulic elements (24, 26) to each other is so dimensioned that their distance (d) is coincident with the distance (d) of the gravitational center from the action line of the hydraulic element 23 of the lateral support system. All other hollow chambers (55b, 24b, 26b) of the hydraulic elements (23, 24, 26), which belong to the lateral support system, are connected via hydraulic lines 33 to each other as well as to the supply vessel 44 for the compensation of the hydrostatic pressure. The attachment of the joints (31b, 31d) of the hydraulic elements (24, 26) for the compensation of lateral pressure occurs in a line 35 with the joint 31c of the hydraulic element 25 for the axial support system parallel to the action line 37 of a pure lateral force.

Except for the three systems described above (axial and lateral support system, system for compensating for lateral moments) there is still another arrangement 62 at the support point of the mirror 38 shown here for an active surface control system. This system compensates surface errors of the mirror 38 which are independent of time. A device 62 of this system is provided at each support point for the mirror 38. The arrangement 62 includes a lever 55 which is attached via a joint 49 to an intermediate piece 52. The intermediate piece 52 is, in turn, connected via a further joint 50 to a base body 51 with the base body 51 being securely connected to the support body 32 at its lower side.

A fixed weight body 46 is disposed on the lever 55 at one end thereof and a movable weight body 53 is at the other end of this lever which can be moved in the direction of arrow 54 by a shaft 59 of a direct-current motor 58. The motor 58 receives its run command from a control 61 via a line 60.

The system of weights on the lever can be supplemented by a spring system (not shown) which acts between the lever 55 and the fixed point 32.

The lever 55 is connected to the intermediate body 42 via a low-friction joint 47 at the intersection point of the connecting line 48 (joint 31c of the hydraulic element 25 for the axial support system and gravitational center of the part of the mirror 38 of the support point) with the line of action 36 of the hydraulic element 23 of the lateral support system.

Figure 5:
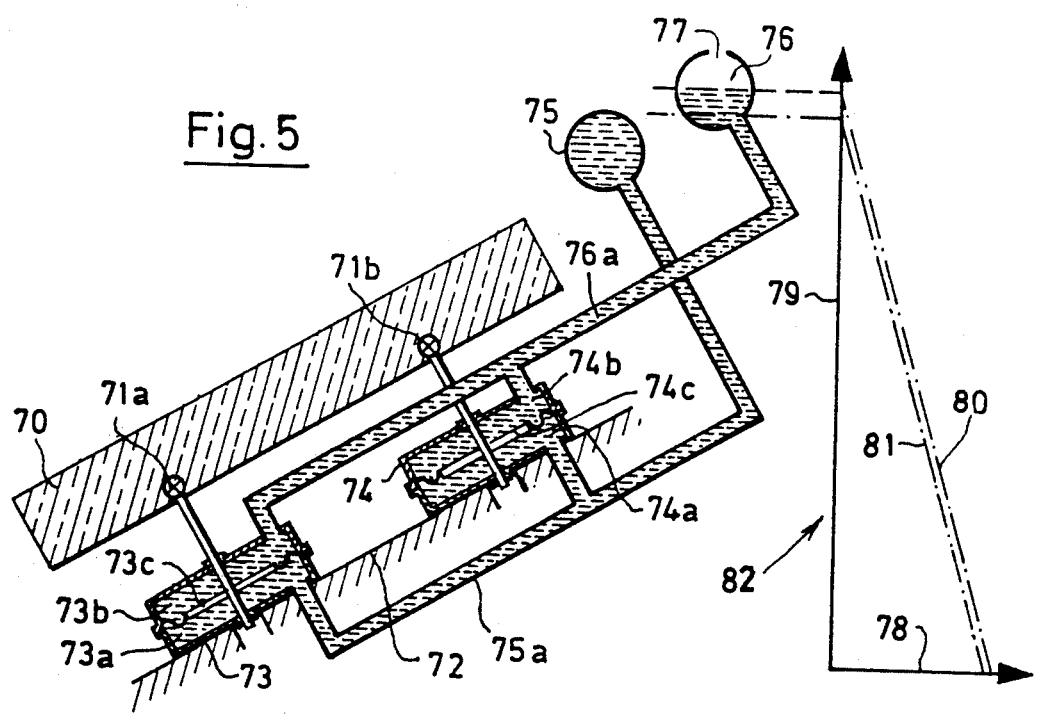

The compensation of the hydrostatic pressure is shown in FIG. 5. A compensation of this kind is not necessary when the mirror 70 is always in a horizontal position. If however, the mirror 70 leaves its horizontal position, then opposite-lying hydraulic elements (73, 74), which are secured to the support body 72, are at different elevations in the gravitational direction with the hydraulic elements (73, 74) being connected to the mirror via joints (71a, 71b). However, since hydraulic liquid is not weightless, a pressure difference results in the hydraulic lines 75a and therefore also in the liquid-filled hollow chambers (73a, 74a) of the hydraulic elements (73, 74). For thin mirrors 70, this pressure difference is adequate to deform these mirrors.

To prevent the hydrostatic pressure differences, the hydraulic elements (73, 74) have a second liquid-filled hollow chamber (73b, 74b) so that the hydraulic pressure difference acts at both sides of the piston (73c, 74c) having the membrane and thereby effectively cancel the hydrostatic pressure difference. The hollow chambers (73b, 74b) for eliminating the hydrostatic pressure difference are connected to each other via a line 76a. In addition, the line 76a is connected to a supply vessel 76 having an opening 77. This supply vessel 76 is mounted relative to the supply vessel 75, which is connected to the hydraulic lines 75a so that its hydraulic volume is above the highest elevation of each individual hydraulic element (73, 74) and of the supply vessel 75 corresponding thereto. This compensation method must be applied to all hydraulic elements (73, 74) if the influence of the function of the hydraulic elements by the hydraulic pressure is to be excluded.

In diagram 82, the pressure results of the hydrostatic effect are once again presented. The diagram 82 shows the pressures 81 in the hollow chambers (73a, 74a) for the support system as well as the pressures 82 in the hollow chambers (73b, 74b) for the pressure compensation referred to the liquid level 79 and the static pressure 78.

It is understood that the foregoing description is that of the preferred embodiments of the invention and that various changes and modifications may be made thereto without departing from the spirit and scope of the invention as defined in the appended claims.

What is claimed is:

1. A mirror support arrangement for a primary mirror of a telescope for non-earthbound vehicles, the mirror being subjected to forces acting laterally on the mirror, the mirror having an optical axis and having a rear side, the mirror support arrangement comprising:

said mirror having a plurality of first support points arranged in a raster on said rear side thereof and a plurality of second support points also arranged on said rear side;

an axial support system having a plurality of axial support elements acting at respective ones of said first support points to simulate a three-point axial support of said mirror;

a lateral support system having a plurality of hydraulic lateral support elements acting at respective ones of said second support points for distributing said forces to said second support points;

said hydraulic lateral support elements being arranged into first and second groups, the support elements of said first group acting in a first direction on said first support points and the elements of said first support points and the elements of said second group acting in a second direction on said second support points to define a V-support whereby lateral forces are taken up within a V-angle conjointly defined by said first and second directions; and, rotation stop means for preventing said mirror from rotating about said optical axis.

2. The mirror support arrangement of claim 1, wherein said second support points are coincident with respective ones of said first support points.

3. The mirror support arrangement of claim 2, wherein said lateral support elements generate moments while counteracting the lateral forces acting on said mirror; and, said lateral support system including a plurality of sets of compensating elements at each of said first and second support points for compensating for said lateral moments.

4. The mirror support arrangement of claim 1, said rotation stop means including a plurality of rotation stop elements acting on selected ones of said first and second support points.

5. The mirror support arrangement of claim 4, further comprising a compensation system connected to said axial and lateral support elements for compensating for hydrostatic effects.

6. The mirror support arrangement of claim 2, further comprising a plurality of devices arranged at respective ones of said first and second support points for nullifying time-independent surface errors of the mirror.

* * * * *

UNITED STATES PATENT AND TRADEMARK OFFICE
CERTIFICATE OF CORRECTION

PATENT NO. : 5,151,809
DATED : September 29, 1992
INVENTOR(S) : Hans-J. Meier

It is certified that error appears in the above-identified patent and that said Letters Patent is hereby corrected as shown below:

In column 2, line 56: delete "reduce" and substitute -- reduced -- therefor.

In column 3, line 34: after "elements", insert -- . --.

In column 10, line 15: delete "first support points and the elements of said".

Signed and Sealed this

Nineteenth Day of October, 1993

Attest:

BRUCE LEHMAN

Attesting Officer        Commissioner of Patents and Trademarks